United States Patent
P et al.

(10) Patent No.: US 9,037,752 B1
(45) Date of Patent: May 19, 2015

(54) REMOTE MATERIALIZATION OF LOW VELOCITY DATA

(71) Applicants: Shahul Hameed P, Sunnyvale, CA (US); Shasha Luo, Sunnyvale, CA (US); Sinisa Knezevic, Sunnydale, CA (US); Engin Dogusoy, San Francisco, CA (US); Petya Nikolova, Sunnyvale, CA (US)

(72) Inventors: Shahul Hameed P, Sunnyvale, CA (US); Shasha Luo, Sunnyvale, CA (US); Sinisa Knezevic, Sunnydale, CA (US); Engin Dogusoy, San Francisco, CA (US); Petya Nikolova, Sunnyvale, CA (US)

(73) Assignee: SAP SE, Walldorf (DE)

( * ) Notice: Subject to any disclaimer, the term of this patent is extended or adjusted under 35 U.S.C. 154(b) by 29 days.

(21) Appl. No.: 14/080,195

(22) Filed: Nov. 14, 2013

(51) Int. Cl.
*G06F 3/00* (2006.01)
*G06F 12/08* (2006.01)
*H04L 29/12* (2006.01)

(52) U.S. Cl.
CPC ......... *G06F 12/0891* (2013.01); *H04L 61/1511* (2013.01); *H04L 29/12047* (2013.01)

(58) Field of Classification Search
CPC ...................... H04L 29/12047; H04L 61/1511
See application file for complete search history.

(56) References Cited

U.S. PATENT DOCUMENTS

| 7,694,065 | B2 | 4/2010 | Petev et al. | |
|---|---|---|---|---|
| 7,899,839 | B2 | 3/2011 | Thiyagarajan et al. | |
| 7,971,001 | B2 | 6/2011 | Petev et al. | |
| 7,996,615 | B2 | 8/2011 | Galchev et al. | |
| 8,005,818 | B2 | 8/2011 | Perry et al. | |
| 8,204,870 | B2 | 6/2012 | Mukkamala et al. | |
| 2002/0199020 | A1* | 12/2002 | Trace et al. | 709/245 |
| 2009/0210429 | A1 | 8/2009 | Agrawal et al. | |
| 2011/0191361 | A1 | 8/2011 | Gupta et al. | |
| 2011/0258199 | A1 | 10/2011 | Oliver et al. | |
| 2012/0130659 | A1 | 5/2012 | Chaves | |
| 2012/0158770 | A1 | 6/2012 | Benadjaoud et al. | |
| 2013/0166568 | A1 | 6/2013 | Sowell et al. | |
| 2014/0012799 | A1 | 1/2014 | Eberlein et al. | |

FOREIGN PATENT DOCUMENTS

| CN | 102081625 B | 6/2011 |
|---|---|---|
| CN | 102799622 A | 11/2012 |

* cited by examiner

*Primary Examiner* — Zachary K Huson
(74) *Attorney, Agent, or Firm* — Buckley, Maschoff & Talwalker LLC

(57) ABSTRACT

A system includes reception of a client query identifying data stored by a remote data source, generation of a remote query of the remote data source based on the client query, determination of a cache name based on the remote query, determination of whether the remote data source comprises a cache associated with the cache name and, if it is determined that the remote data source comprises a valid cache associated with the cache name, instruction of the remote data source to read the data of the cache, and reception of the data of the cache from the remote data source.

18 Claims, 5 Drawing Sheets

REMOTE MATERIALIZATION OF LOW VELOCITY DATA

BACKGROUND

Conventional database management systems provide stored data to client applications upon request. The data may be stored in local disks and/or local volatile memory (e.g., Random Access Memory) in order to enable fast access thereto. Some database management systems are also capable of pulling data from remote (and typically large-scale) data sources. Systems are desired to interact with such remote data sources in order to efficiently provide the remote data to client applications.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
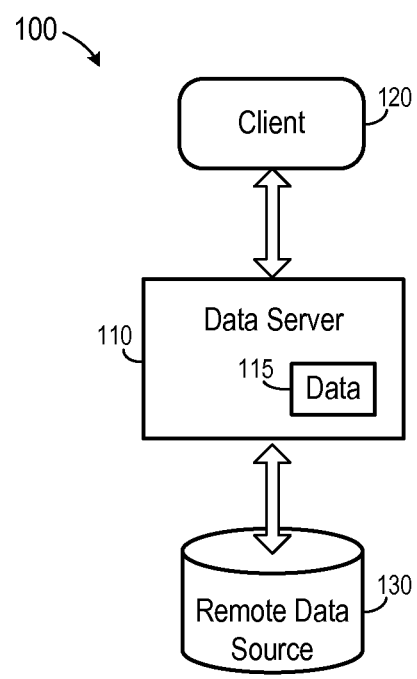
FIG. 1 is a block diagram of a system according to some embodiments.

FIG. 1 is a block diagram of system 100 according to some embodiments. System 100 includes data server 110, client 120, and remote data source 130. Generally, data server 110 receives queries from client 120 and provides results thereto based on data of data 115 and/or remote data source 130. Data server 110 may support multi-tenancy for multiple unrelated clients by providing multiple logical database systems which are programmatically isolated from one another.

Data 115 may be stored in Random Access Memory (e.g., cache memory for storing recently-used data) and one or more fixed disks (e.g., persistent memory for storing their respective portions of the full database). Alternatively, data server 110 may implement an "in-memory" database, in which data 115 is a full database stored in volatile (e.g., non-disk-based) memory (e.g., Random Access Memory).

In some embodiments, data 115 may comprise one or more of conventional tabular data, row-based data, column-based data, and object-based data. Moreover, the data of data source 110 may be indexed and/or selectively replicated in an index to allow fast searching and retrieval thereof.

Client 120 may comprise one or more devices executing program code of a software application for presenting user interfaces to allow interaction with data server 110. For example, a user may manipulate such user interfaces to request particular data (e.g., for populating a spreadsheet, a graph, etc.). In response, client 120 executes program code of a software application to generate a query (e.g., a structured-query language (SQL) query) identifying the requested data, and to transmit the query to data server 110.

Presentation of a user interface may comprise any degree or type of rendering. For example, client 120 may execute a Web Browser to receive a Web page (e.g., in HTML format) from data server 110, and may render and present the Web page according to known protocols. Client 120 may also or alternatively present user interfaces by executing a standalone executable file (e.g., an .exe file) or code (e.g., a JAVA applet) within a virtual machine. System 100 may include any number of clients 120 of one or more types according to some embodiments.

Remote data source 130 may comprise any query-responsive data source or sources that are or become known, including but not limited to a structured-query language (SQL) relational database management system. Remote data source 130 may comprise a relational database, a multi-dimensional database, an eXtendable Markup Language (XML) document, or any other data storage system storing structured and/or unstructured data. The data of remote data source 130 may be distributed among several relational databases, dimensional databases, and/or other data sources. Embodiments are not limited to any number or types of data sources. For example, remote data source 130 may comprise one or more OnLine Analytical Processing (OLAP) databases, spreadsheets, text documents, presentations, etc.

According to some embodiments, remote data source 130 may comprise a distributed file system. For example, remote data source 130 may comprise a distributed file system for use by data-intensive distributed applications, such as that provided by Apache Hadoop. In this regard, remote data source 130 may also comprise an SQL interface to the distributed file system, such as Apache Hive.

Remote data source 130 might be significantly less responsive to database queries than data server 110, due to the size of its data and/or other characteristics. Accordingly, embodiments of the below-described process may provide a more-efficient system to retrieve data from remote data source 130.

Figure 2:
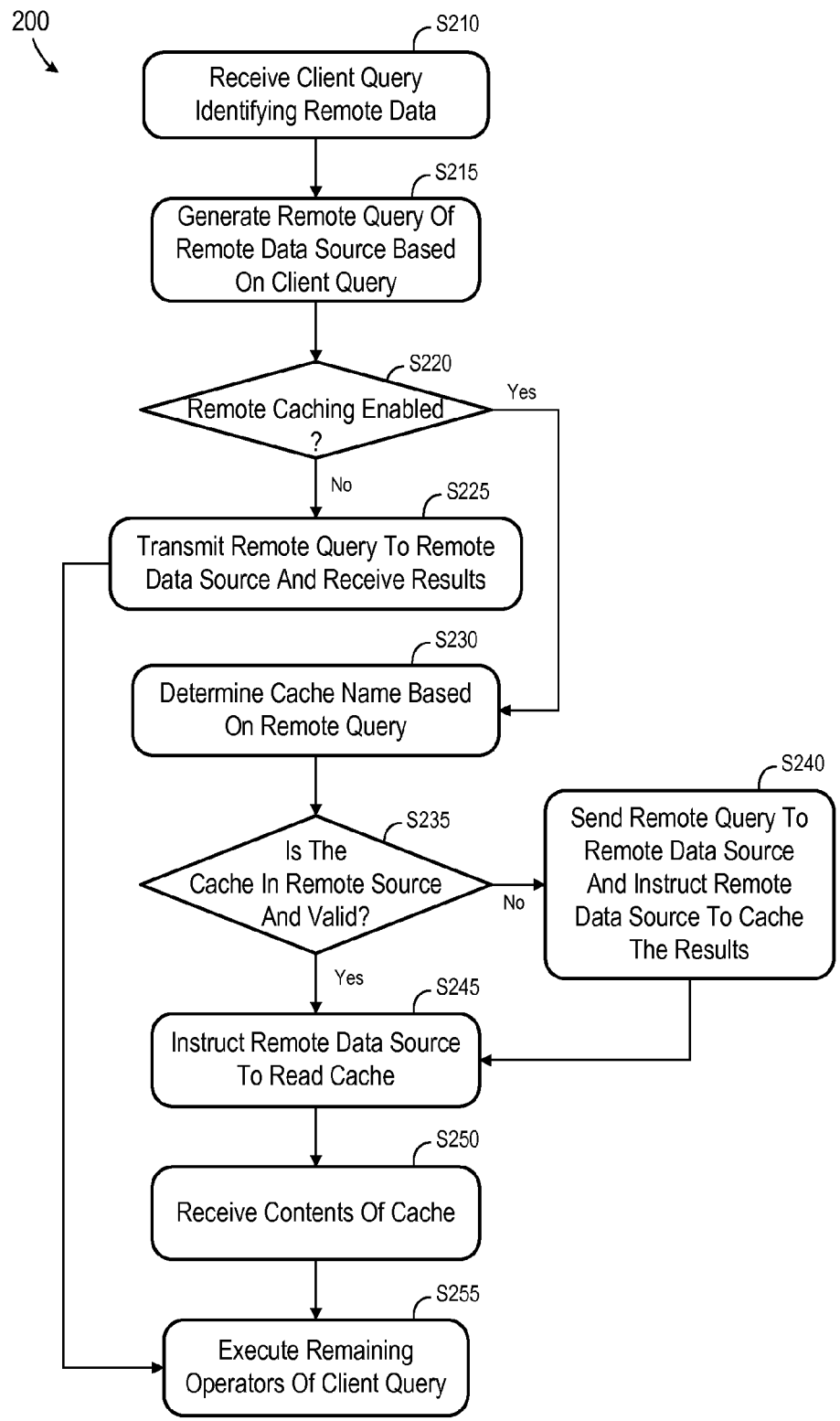
FIG. 2 is a flow diagram of a process according to some embodiments.

FIG. 2 comprises a flow diagram of process 200 according to some embodiments. In some embodiments, various hardware elements of data server 110 execute program code to perform process 200. Process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, a client query is received at S210. The client query identifies remote data stored by a remote data source. The client query might also identify local data, and include operators indicating how the selected remote data and local data are to be combined into a result set. With reference to system 100, data server 110 may receive the client query at S210 from client 120 according to some embodiments.

The following is an example of a client query according to some embodiments:
SELECT A.CUSTOMER_ID, A.PRIORITY, B.SENSOR_ID, B.SENSOR_LOCATION FROM CUSTOMER_ISSUES A JOIN HIVE_SENSOR_RECORDS B ON (A.CUSTOMER_ID=B.OWNER_ID) WHERE A.REGION='NA' AND B.STATUS='ERROR' AND B.EVENT_DATE='02-24-2013' WITH HINT (USE_REMOTE_CACHE)

The above query is an SQL-formatted query, but a client query according to some embodiments may be formatted in any query language that is or becomes known. According to the present example, the term "HIVE_SENSOR_RECORDS" identifies remote data stored by a remote data source.

A remote query of the remote data source is generated based on the received client query at S215. Generally, S215 is intended to generate a separate query of the remote data source which elicits data from the remote data source that is needed to respond to the client query. The remote query is generated based on the dialect and operators supported by the query interface of the remote data source.

Based on the client query set forth above, data server 110 may generate the following query at S215 according to some embodiments:
SELECT HIVE_RC.SENSOR_ID, HIVE_RC.SENSOR_LOCATION FROM SENSOR_RECORDS HIVE_RC WHERE HIVE_RC. EVENT_DATE='02-24-2013' AND HIVE_RC. STATUS='ERROR'

Next, at S220, data server 110 determines whether remote caching is enabled in remote data source 130. The determination at S220 may comprise transmitting an inquiry to remote data source 130 or checking a local flag stored in data server 110. Flow proceeds to S225 if remote caching is not enabled. At S225, the remote query generated at S215 is transmitted to the remote data source and a corresponding result set is received therefrom. Flow then continues to S255 to execute the remaining operators of the client query (i.e., those identifying local data). Execution of the remaining operators results in joining the local data and the remote data into a final result set and returning the final result set to the client.

Returning to S220, flow proceeds to S230 if it is determined that remote caching is enabled in the remote data source. A cache name is determined at S230 based on the remote query generated at S215. The cache name may be determined at S230 by building a hash out of the remote query. The hash may be built from additional data elements, including but not limited to one or more of a host name and instance number associated with the data server, and ordered parameter values of the remote query. By building the hash based on the host name and instance number, a conflict is avoided in a case that any two nodes of a multi-node data server attempt to create a remote cache for the same query. Embodiments are not limited to hashes; other systems for generating a cache name based on these data elements may be employed.

At S235, it is determined whether the remote data source includes a cache associated with the determined cache name, and, if so, whether the cache is valid. Therefore, S235 includes transmission of an inquiry to the remote data source to determine the existence of a cache associated with the determined cache name. If the remote data source indicates that no cache exists, flow proceeds to S240. If the remote data source indicates that such a cache exists, the validity of the cache is determined.

For example, data server 110 may determine, based on a timestamp or other temporal indicator received from remote data source 130, that the cache is not valid because it was created too long ago. In this regard, the present inventors have identified reading data from a cache of remote data source 130 as a faster alternative to executing a database query within remote data source 130. However, as the cache ages, the likelihood that its data no longer reflects the current data of the remote data source 130 increases. Accordingly, the validity determination at S235 may compare the age of the data in the cache to a threshold. If the age is greater than the threshold, flow proceeds to S240.

The threshold may be configurable, and may be cache-specific. In this regard, some data of the remote data source may be expected to change less frequently than other data of the remote data source. Accordingly, a validity period of a cache storing the former data may be configured to be longer than a validity period of a cache storing the latter data.

Figure 3:
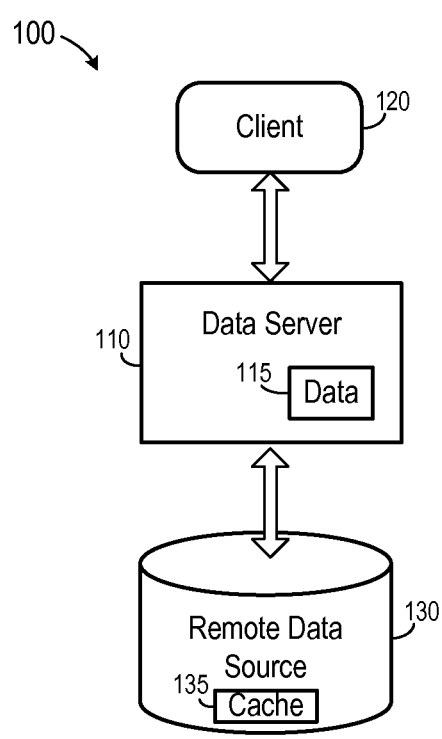
FIG. 3 is a block diagram of a system according to some embodiments.

At S240, the remote query is sent to the remote data source and the remote data source is instructed to cache the result data. Continuing the present example, data server 110 may send the following query to remote data source 130 at S240:
INSERT INTO TABLE t1f85d12e392fd3fe76cb5172bd1e4897 AS SELECT HIVE_RC.SENSOR_ID, HIVE_RC.SENSOR_LOCATION FROM SENSOR_RECORDS HIVE_RC WHERE HIVE_RC. EVENT_DATE='02-24-2013' AND HIVE_RC. STATUS='ERROR'
In the above example, "t1f85d12e392fd3fe76cb5172bd1e4897" of the INSERT clause is the cache name determined at S230 and the remainder of the query is the remote query generated at S215. FIG. 3 illustrates remote data source 130 with cache 135 as created at S240 according to some embodiments.

The cache is then read at S245 by transmitting a query to the remote data source such as the following:
SELECT*FROM t1f85d12e392fd3fe76cb5172bd1e4897
Data server 110 receives the contents of the cache (i.e., the result set) at S250, and flow executes at S255 as described above.

In a case that it is determined at S235 that a cache associated with the determined cache name exists in the remote data source and the cache is valid, flow proceeds directly to S245 to instruct the remote data source to read the contents of the cache. In these instances, acquiring the required data from the remote data source proceeds much more quickly than in an instance where the remote data source is required to execute a database query.

Figure 4:
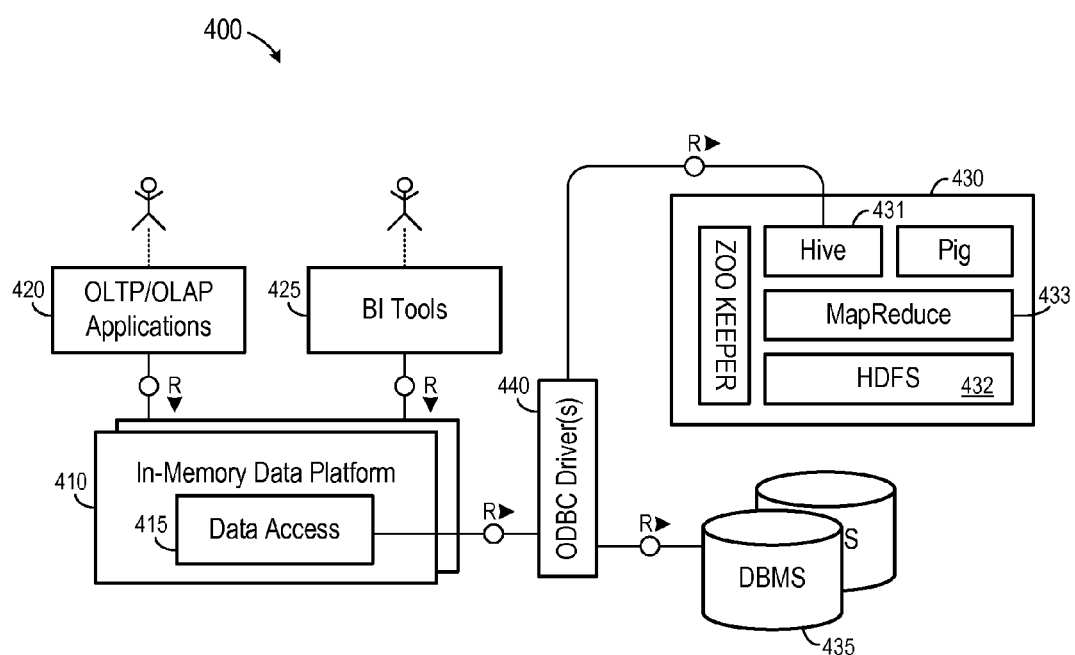
FIG. 4 is a detailed block diagram of a system according to some embodiments.

FIG. 4 is a detailed block diagram of system 400 according to some embodiments. System 400 may comprise an implementation of system 100 and, as such, the elements of system 400 may execute process 200 according to some embodiments.

In-memory data platform 410 may support multiple instances, and includes data access component 415 for accessing data not otherwise stored in volatile memory of platform 410. In some embodiments, data access component 415 may comprise program code executable to cause performance of process 200. As described above, access to this remote data may be required in response to queries received from client applications such as OnLine Transaction Processing/OnLine Analytical Processing applications 420 and Business Intelligence tools 425.

Remote data source 430 comprises a Hadoop/Hive data source as described above. Hive component 431 is a query interface to underlying Hadoop File System 432, while MapReduce component supports distributed query execution. Remote data source 435 may comprise any type of data source, including but not limited to a conventional database management system. Data access 415 communicates with each of remote data sources 430 and 435 via ODBC drivers 440.

Figure 5:
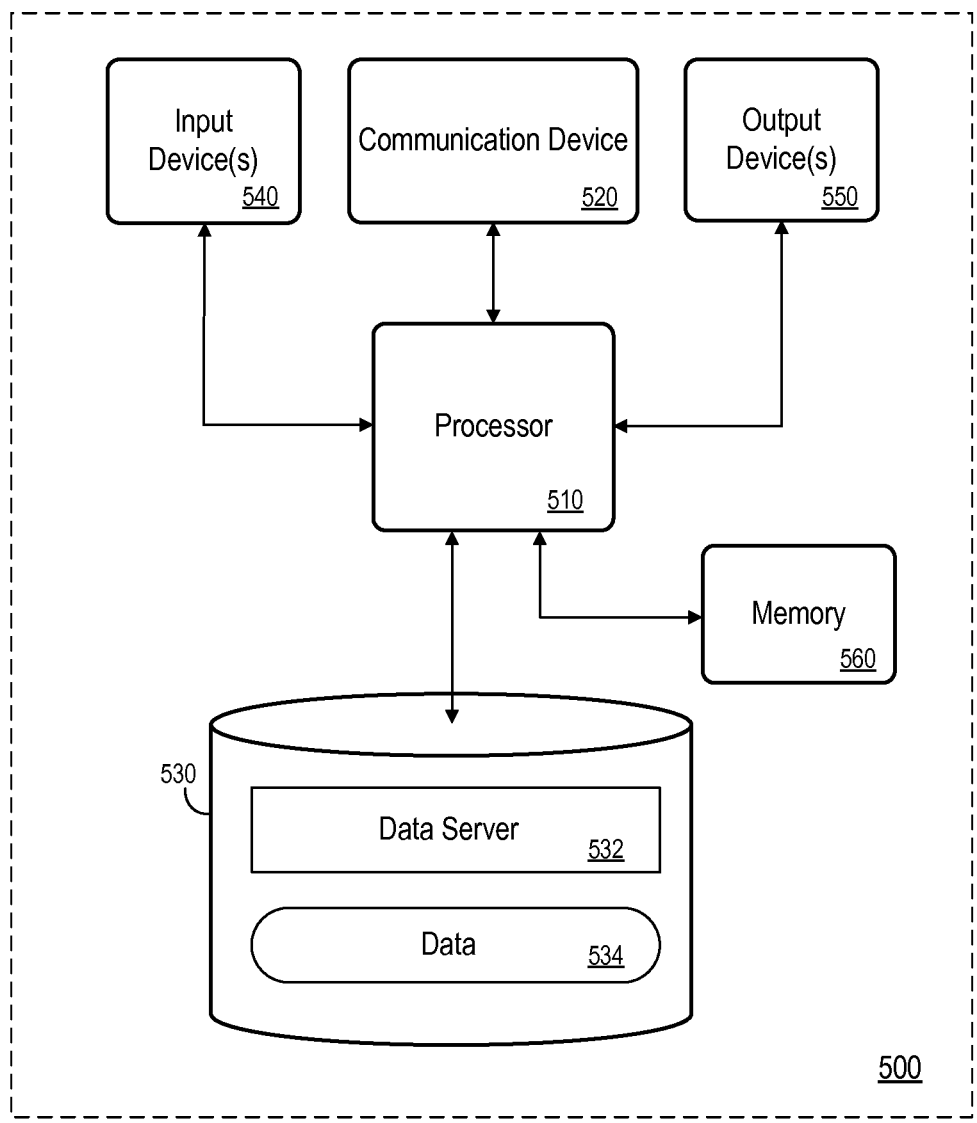
FIG. 5 is a block diagram of an apparatus according to some embodiments.

FIG. 5 is a block diagram of apparatus 500 according to some embodiments. Apparatus 500 may comprise a general-purpose computing apparatus and may execute program code to perform any of the functions described herein. Apparatus 500 may comprise an implementation of data server 110 in some embodiments. Apparatus 500 may include other unshown elements according to some embodiments.

Apparatus 500 includes processor 510 operatively coupled to communication device 520, data storage device 530, one or more input devices 540, one or more output devices 550 and memory 560. Communication device 520 may facilitate communication with external devices, such as a reporting client, or a data storage device. Input device(s) 540 may comprise, for example, a keyboard, a keypad, a mouse or other pointing device, a microphone, knob or a switch, an infra-red (IR) port, a docking station, and/or a touch screen. Input device(s) 540 may be used, for example, to enter information into apparatus 500. Output device(s) 550 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise Random Access Memory (RAM).

Data server 532 may comprise program code executed by processor 510 to cause apparatus 500 to perform any one or more of the processes described herein. Embodiments are not limited to execution of these processes by a single apparatus. Data may include conventional database data as described above. As also described above, database data (either cached or a full database) may be stored in volatile memory such as memory 560. Data storage device 530 may also store data and other program code for providing additional functionality and/or which are necessary for operation of apparatus 500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a data storage device storing data;
a computing device comprising:
   a memory storing processor-executable program code; and
   a processor to execute the processor-executable program code in order to cause the computing device to:
      receive a client query identifying data stored by a remote data source;
      generate a remote query of the remote data source based on the client query;
      determine a cache name based on the remote query;
      determine whether the remote data source comprises a cache associated with the cache name; and
      if it is determined that the remote data source comprises a valid cache associated with the cache name, instruct the remote data source to read the data of the cache, and receive the data of the cache from the remote data source.

2. A system according to claim 1, wherein determination of the cache name comprises generation of a hash based on the remote query and a host system identifier.

3. A system according to claim 2, the processor to further execute the processor-executable program code in order to cause the computing device to:
execute remaining operators of the client query to generate result data; and
join the received data and the result data.

4. A system according to claim 1, the processor to further execute the processor-executable program code in order to cause the computing device to:
if it is determined that the remote data source does not comprise a valid cache associated with the cache name, transmit an instruction to the remote data source to execute the remote query, to create a cache associated with the cache name, and to store result data of the remote query execution in the created cache.

5. A system according to claim 4, wherein determination of the cache name comprises generation of a hash based on the remote query and an identifier of the host system.

6. A system according to claim 5, the processor to further execute the processor-executable program code in order to cause the computing device to:
execute remaining operators of the client query to generate second result data; and
join the result data of the remote query execution and the second results.

7. A non-transitory computer-readable medium storing program code, the program code executable by a processor of a computing system to cause the computing system to:
receive a client query identifying data stored by a remote data source;
generate a remote query of the remote data source based on the client query;
determine a cache name based on the remote query;
determine whether the remote data source comprises a cache associated with the cache name; and
if it is determined that the remote data source comprises a valid cache associated with the cache name, instruct the remote data source to read the data of the cache, and receive the data of the cache from the remote data source.

8. A medium according to claim 7, wherein determination of the cache name comprises generation of a hash based on the remote query and a host system identifier.

9. A medium according to claim 8, the program code further executable by a processor of the computing system to cause the computing system to:
execute remaining operators of the client query to generate result data; and
join the received data and the result data.

10. A medium according to claim 7, the program code further executable by a processor of the computing system to cause the computing system to:

if it is determined that the remote data source does not comprise a valid cache associated with the cache name, transmit an instruction to the remote data source to execute the remote query, to create a cache associated with the cache name, and to store result data of the remote query execution in the created cache.

11. A medium according to claim 10, wherein determination of the cache name comprises generation of a hash based on the remote query and an identifier of the host system.

12. A medium according to claim 11, the program code further executable by a processor of the computing system to cause the computing system to:
execute remaining operators of the client query to generate second result data; and
join the result data of the remote query execution and the second results.

13. A computer-implemented method comprising:
receiving a client query identifying data stored by a remote data source;
generating a remote query of the remote data source based on the client query;
determining a cache name based on the remote query;
determining whether the remote data source comprises a cache associated with the cache name; and
if it is determined that the remote data source comprises a valid cache associated with the cache name, instructing the remote data source to read the data of the cache, and receiving the data of the cache from the remote data source.

14. A method according to claim 13, wherein determining the cache name comprises generating a hash based on the remote query and a host system identifier.

15. A method according to claim 14, further comprising:
executing remaining operators of the client query to generate result data; and
joining the received data and the result data.

16. A method according to claim 13, further comprising:
if it is determined that the remote data source does not comprise a valid cache associated with the cache name, transmitting an instruction to the remote data source to execute the remote query, to create a cache associated with the cache name, and to store result data of the remote query execution in the created cache.

17. A method according to claim 16, wherein determining the cache name comprises generating a hash based on the remote query and an identifier of the host system.

18. A method according to claim 17, further r comprising:
executing remaining operators of the client query to generate second result data; and
joining the result data of the remote query execution and the second results.

* * * * *